(12) United States Patent
Zou et al.

(10) Patent No.: US 12,015,956 B2
(45) Date of Patent: Jun. 18, 2024

(54) PSCELL ACTIVATION WITH EARLY DATA-FORWARDING FOR DUAL CONNECTIVITY BASED HANDOVER

(71) Applicant: Huawei Technologies Co., Ltd., Shenzhen (CN)

(72) Inventors: Jialin Zou, Randolph, NJ (US); Hongping Zhang, Shanghai (CN); Le Yan, Shanghai (CN); Hua Xu, Ottawa (CA); Liqing Zhang, Ottawa (CA); Usa Vilaipornsawai, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 17/340,285

(22) Filed: Jun. 7, 2021

(65) Prior Publication Data
US 2021/0368399 A1 Nov. 25, 2021

Related U.S. Application Data

(63) Continuation of application No. PCT/CN2019/076023, filed on Feb. 25, 2019.

(51) Int. Cl.
*H04W 36/00* (2009.01)
(52) U.S. Cl.
CPC . *H04W 36/0055* (2013.01); *H04W 36/00837* (2018.08)
(58) Field of Classification Search
None
See application file for complete search history.

(56) References Cited

U.S. PATENT DOCUMENTS

| 2012/0155377 | A1 | 6/2012 | Chai | |
| 2015/0223137 | A1* | 8/2015 | Kim | H04W 36/0005 455/438 |
| 2016/0135165 | A1* | 5/2016 | Takano | H04W 72/20 370/329 |
| 2019/0200406 | A1* | 6/2019 | Henttonen | H04W 28/0268 |

FOREIGN PATENT DOCUMENTS

| CN | 103428751 A | 12/2013 |
| WO | 2010128902 A1 | 11/2010 |
| WO | 2018171916 A1 | 9/2018 |
| WO | 2018192705 A1 | 10/2018 |

OTHER PUBLICATIONS

Huawei (Rapporteur), "Introduction of NB-IoT", 3GPP TSG-RAN WG2 Meeting #93, R2-162068, Feb. 15-19, 2016, 289 Pages, St Julian's, Malta.

* cited by examiner

*Primary Examiner* — Suhail Khan
(74) *Attorney, Agent, or Firm* — Slater Matsil, LLP

(57) ABSTRACT

According to one aspect of the present disclosure, a method for handover in a radio access network is provided, wherein the method includes receiving, by a user equipment (UE), a handover pre-configuration message from a source node serving the UE in the radio access network, the handover pre-configuration message including handover information of a target node in the radio access network, receiving, by the UE, an activation command from the source node after receiving the handover pre-configuration message, and transmitting, by the UE, an access request message to the target node in accordance with the handover information in response to receiving the activation command.

18 Claims, 10 Drawing Sheets

PSCELL ACTIVATION WITH EARLY DATA-FORWARDING FOR DUAL CONNECTIVITY BASED HANDOVER

CROSS-REFERENCE TO RELATED APPLICATIONS

This application is a continuation of International Application No. PCT/CN2019/076023, filed on Feb. 25, 2019, entitled "PSCell Activation with Early Data-Forwarding for Dual Connectivity Based Handover", which application is hereby incorporated herein by reference.

TECHNICAL FIELD

The present disclosure relates to wireless communications, and in particular embodiments, to systems and methods for performing handover in a radio access network.

BACKGROUND

To meet requirements of Ultra-Reliable and Low-Latency Communications (URLLC), mobility management in $5^{th}$ generation (5G) new radio (NR) networks faces many challenges. In next generation networks, a user equipment (UE) may lose an opportunity to access a target radio access node, which causes a handover failure due to delays introduced by a rigid configuration process of a conventional handover procedure. Without proper data synchronization and buffer management mechanisms, the conventional handover procedure may not support a Dual Connectivity (DC) technique, which can be used in 5G NR to reduce traffic latency and to achieve oms service interruption. Advanced handover techniques are desired to solve the above issues.

SUMMARY

Technical advantages are generally achieved, by embodiments of this disclosure which describe handover methods for performing deferred access and data synchronization.

According to one aspect of the present disclosure, a method for handover in a radio access network is provided, wherein the method includes receiving, by a user equipment (UE), a handover pre-configuration message from a source node serving the UE in the radio access network, the handover pre-configuration message including handover information of a target node in the radio access network, receiving, by the UE, an activation command from the source node after receiving the handover pre-configuration message, and transmitting, by the UE, an access request message to the target node in accordance with the handover information in response to receiving the activation command.

Optionally, in some embodiments of any of the preceding aspects, the UE defers transmitting the access request message until the UE receives the activation command.

Optionally, in some embodiments of any of the preceding aspects, the handover pre-configuration message includes an indication that instructs the UE to defer accessing the target node until the UE receives the activation command.

Optionally, in some embodiments of any of the preceding aspects, at least one of the activation command and the access request message includes a protocol data unit (PDU) sequence number indicating from which PDU a data transmission from the target node to the UE starts, and wherein the method further comprises receiving, by the UE, a first set of PDUs from the source node, and a second set of PDUs from the target node, a sequence number of a first PDU in the second set of PDUs being equal to the PDU sequence number, and combining, by the UE, the first set of PDUs and the second set of PDUs.

Optionally, in some embodiments of any of the preceding aspects, the at least one of the activation command and the access request message further includes information indicating whether data from the source node and the target node to the UE are different or the same.

Optionally, in some embodiments of any of the preceding aspects, the information indicates that the data from the source node and the target node to the UE are different, and wherein the UE combines the first set of PDUs and the second set of PDUs in accordance with the PDU sequence number and a data split pattern indicating a relation between the first set of PDUs and the second set of PDUs.

Optionally, in some embodiments of any of the preceding aspects, the at least one of the activation command and the access request message further includes the data split pattern.

Optionally, in some embodiments of any of the preceding aspects, the information indicates that the data from the source node and the target node to the UE are the same, and wherein the UE combines the first set of PDUs and the second set of PDUs through duplicated PDU decoding and re-sequencing in accordance with the PDU sequence number.

Optionally, in some embodiments of any of the preceding aspects, the method further comprises blindly decoding, by the UE, information on a physical downlink control channel (PDCCH) from the target node after transmitting the access request message.

Optionally, in some embodiments of any of the preceding aspects, the method further comprises transmitting, by the UE, a series of physical layer measurement reports to the source node, the series of physical layer measurement reports including measurement results of the target node.

Optionally, in some embodiments of any of the preceding aspects, the activation command is carried by a medium access control (MAC) control element (CE) of a MAC layer PDU or physical layer downlink control information (DCI).

Optionally, in some embodiments of any of the preceding aspects, the radio access network supports a multi-radio dual connectivity (MR-DC) mechanism, the source node is a master node of the MR-DC mechanism, and the target node is a secondary node of the MR-DC mechanism.

Optionally, in some embodiments of any of the preceding aspects, the access request message contains a primary secondary cell (PSCell) activation command for activating the target node as a secondary node of the MR-DC mechanism.

Optionally, in some embodiments of any of the preceding aspects, after receiving the handover pre-configuration message and before receiving the activation command, the UE moves towards a coverage border between the source node and the target node.

Optionally, in some embodiments of any of the preceding aspects, the activation command is received when a radio link condition between the UE and the source node is worse than a first threshold or a radio link condition between the UE and the target node is better than a second threshold.

According to another aspect of the present disclosure, a method for handover in a radio access network is provided, wherein the method includes transmitting, by a source node serving a UE in the radio access network, a handover pre-configuration message to the UE, the handover pre-configuration message including handover information of a target node in the radio access network, and transmitting, by the source node, an activation command to the UE, the activation command instructing the UE to access the target node in accordance with the handover information.

Optionally, in some embodiments of any of the preceding aspects, the handover pre-configuration message includes an indication that instructs the UE to defer accessing the target node until the UE receives the activation command.

Optionally, in some embodiments of any of the preceding aspects, the method further comprises transmitting, by the source node, a configuration message to the target node before transmitting the handover pre-configuration message to the UE, wherein the configuration message includes a handover configuration for the target node.

Optionally, in some embodiments of any of the preceding aspects, the handover configuration of the configuration message includes at least one of an identification (ID) of the UE, quality of service (QoS) information of the UE, and security key configuration of the UE.

Optionally, in some embodiments of any of the preceding aspects, the method further comprises forwarding, by the source node, at least one PDU to the target node after transmitting the configuration message to the target node.

Optionally, in some embodiments of any of the preceding aspects, the configuration message instructs the target node to buffer the at least one PDU.

Optionally, in some embodiments of any of the preceding aspects, the method further comprises transmitting, by the source node, one or more synchronization messages to the target node, wherein each of the one or more synchronization messages indicates at least one of a recent PDU transmitted from the source node to the UE and a rate of a data transmission from the source node to the UE.

Optionally, in some embodiments of any of the preceding aspects, the activation command includes a PDU sequence number indicating from which PDU a data transmission from the target node to the UE starts.

Optionally, in some embodiments of any of the preceding aspects, the activation command further includes information indicating whether data from the source node and the target node to the UE are the same or different.

Optionally, in some embodiments of any of the preceding aspects, the information indicates that the data from the source node and the target node to the UE are different, and wherein a data split pattern indicating a relation between PDUs from the source node and PDUs from the target node.

Optionally, in some embodiments of any of the preceding aspects, the activation command further includes the data split pattern.

Optionally, in some embodiments of any of the preceding aspects, the method further comprises receiving, by the source node, a series of physical layer measurement reports from the UE, the series of physical layer measurement reports including measurement results of the target node, wherein the source node transmits the handover pre-configuration message and the activation command to the UE in accordance with at least one of the series of physical layer measurement reports.

Optionally, in some embodiments of any of the preceding aspects, the activation command is carried by a MAC CE of a MAC layer PDU or physical layer DCI.

Optionally, in some embodiments of any of the preceding aspects, the radio access network supports an MR-DC mechanism, and the source node is a master node of the MR-DC mechanism, and the target node is a secondary node of the MR-DC mechanism.

According to another aspect of the present disclosure, a method for handover in a radio access network is provided, wherein the method includes receiving, by a target node in the radio access network, a configuration message from a source node in the radio access network, the configuration message including a handover configuration for a handover of a UE from the source node to the target node, and receiving, by the target node, an access request message from the UE in accordance with the handover configuration.

Optionally, in some embodiments of any of the preceding aspects, the method further comprises buffering, by the target node, a plurality of PDUs for the UE after the target node receives the plurality of PDUs from either the source node or a core network.

Optionally, in some embodiments of any of the preceding aspects, the method further comprises receiving, by the target node, a synchronization message from the source node after buffering the plurality of PDUs, the synchronization message including a sequence number of a recent PDU transmitted from the source node to the UE.

Optionally, in some embodiments of any of the preceding aspects, the synchronization message includes a rate of a data transmission from the source node to the UE.

Optionally, in some embodiments of any of the preceding aspects, the method further comprises removing, by the target node, a first set of the plurality of PDUs in accordance with the sequence number of the recent PDU transmitted from the source node to the UE and the rate of the data transmission.

Optionally, in some embodiments of any of the preceding aspects, the access request message includes a starting sequence number, and the method further comprises transmitting, by the target node, a second set of the plurality of PDUs, a smallest sequence number of the second set of the plurality of PDUs being equal to the starting sequence number.

Optionally, in some embodiments of any of the preceding aspects, the access request message further includes information indicating whether data from the source node and the target node to the UE are the same or different.

Optionally, in some embodiments of any of the preceding aspects, the information indicates that the data from the source node and the target node to the UE are different, and wherein the access request message further includes a data split pattern indicating a relation between the data from the source node to the UE and the second set of the plurality of PDUs.

Optionally, in some embodiments of any of the preceding aspects, the radio access network supports an MR-DC mechanism, and the source node is a master node of the MR-DC mechanism, and the target node is a secondary node of the MR-DC mechanism.

According to another aspect of the present disclosure, a UE is provided, wherein the UE comprises a non-transitory memory storage comprising instructions; and one or more processors in communication with the non-transitory memory storage, wherein the one or more processors execute the instructions to receive a handover pre-configuration message from a source node serving the UE in a radio access network, the handover pre-configuration message including handover information of a target node in the radio access network, receive an activation command from the source node after receiving the handover pre-configuration message, and transmit an access request message to the target node in accordance with the handover information in response to receiving the activation command.

Optionally, in some embodiments of any of the preceding aspects, the UE defers transmitting the access request message until the UE receives the activation command.

Optionally, in some embodiments of any of the preceding aspects, the handover pre-configuration message includes an indication that instructs the UE to defer accessing the target node until the UE receives the activation command.

Optionally, in some embodiments of any of the preceding aspects, at least one of the activation command and the access request message includes a PDU sequence number indicating from which PDU a data transmission from the target node to the UE starts, and the one or more processors execute further instructions to receive a first set of PDUs from the source node, and a second set of PDUs from the target node, a sequence number of a first PDU in the second set of PDUs being equal to the PDU sequence number, and combine the first set of PDUs and the second set of PDUs.

Optionally, in some embodiments of any of the preceding aspects, the at least one of the activation command and the access request message further includes information indicating whether data from the source node and the target node to the UE are different or the same.

Optionally, in some embodiments of any of the preceding aspects, the information indicates that the data from the source node and the target node to the UE are different, and wherein the UE combines the first set of PDUs and the second set of PDUs in accordance with the PDU sequence number and a data split pattern indicating a relation between the first set of PDUs and the second set of PDUs.

Optionally, in some embodiments of any of the preceding aspects, the at least one of the activation command and the access request message further includes the data split pattern.

Optionally, in some embodiments of any of the preceding aspects, the information indicates that the data from the source node and the target node to the UE are the same, and wherein the UE combines the first set of PDUs and the second set of PDUs through duplicated PDU decoding and re-sequencing in accordance with the PDU sequence number.

Optionally, in some embodiments of any of the preceding aspects, the UE blindly decode information on a PDCCH from the target node after transmitting the access request message.

Optionally, in some embodiments of any of the preceding aspects, the one or more processors execute further instructions to transmit a series of physical layer measurement reports to the source node, the series of physical layer measurement reports including measurement results of the target node.

Optionally, in some embodiments of any of the preceding aspects, the activation command is carried by an MAC CE of a MAC layer PDU or physical layer DCI.

Optionally, in some embodiments of any of the preceding aspects, the radio access network supports an MR-DC mechanism, the source node is a master node of the MR-DC mechanism, and the target node is a secondary node of the MR-DC mechanism.

Optionally, in some embodiments of any of the preceding aspects, the access request message contains a PSCell activation command for activating the target node as a secondary node of the MR-DC mechanism.

Optionally, in some embodiments of any of the preceding aspects, after receiving the handover pre-configuration message and before receiving the activation command, the UE moves towards a coverage border between the source node and the target node.

Optionally, in some embodiments of any of the preceding aspects, the activation command is received when a radio link condition between the UE and the source node is worse than a first threshold or a radio link condition between the UE and the target node is better than a second threshold.

According to another aspect of the present disclosure, a source node is provided, wherein the source node comprises a non-transitory memory storage comprising instructions, and one or more processors in communication with the non-transitory memory storage, wherein the one or more processors execute the instructions to transmit a handover pre-configuration message to the UE, the handover pre-configuration message including handover information of a target node in the radio access network, and transmit an activation command to the UE, the activation command instructing the UE to access the target node in accordance with the handover information.

Optionally, in some embodiments of any of the preceding aspects, the handover pre-configuration message includes an indication that instructs the UE to defer accessing the target node until the UE receives the activation command.

Optionally, in some embodiments of any of the preceding aspects, the one or more processors execute further instructions to transmit a configuration message to the target node before transmitting the handover pre-configuration message to the UE, wherein the configuration message includes a handover configuration for the target node.

Optionally, in some embodiments of any of the preceding aspects, the handover configuration of the configuration message includes at least one of an ID of the UE, QoS information of the UE, and security key configuration of the UE.

Optionally, in some embodiments of any of the preceding aspects, the one or more processors execute further instructions to forward at least one PDU to the target node after transmitting the configuration message to the target node.

Optionally, in some embodiments of any of the preceding aspects, the configuration message instructs the target node to buffer the at least one PDU.

Optionally, in some embodiments of any of the preceding aspects, the one or more processors execute further instructions to transmit one or more synchronization messages to the target node, wherein each of the one or more synchronization messages indicates at least one of a recent PDU transmitted from the source node to the UE and a rate of a data transmission from the source node to the UE.

Optionally, in some embodiments of any of the preceding aspects, the activation command includes a PDU sequence number indicating from which PDU a data transmission from the target node to the UE starts.

Optionally, in some embodiments of any of the preceding aspects, the activation command further includes information indicating whether data from the source node and the target node to the UE are the same or different.

Optionally, in some embodiments of any of the preceding aspects, the information indicates that the data from the source node and the target node to the UE are different, and wherein a data split pattern indicating a relation between PDUs from the source node and PDUs from the target node.

Optionally, in some embodiments of any of the preceding aspects, the activation command further includes the data split pattern.

Optionally, in some embodiments of any of the preceding aspects, the one or more processors execute further instructions to receive a series of physical layer measurement reports from the UE, the series of physical layer measurement reports including measurement results of the target node, wherein the source node transmits the handover preconfiguration message and the activation command to the UE in accordance with at least one of the series of physical layer measurement reports.

Optionally, in some embodiments of any of the preceding aspects, the activation command is carried by an MAC CE of a MAC layer PDU or physical layer DCI.

Optionally, in some embodiments of any of the preceding aspects, the radio access network supports an MR-DC mechanism, and the source node is a master node of the MR-DC mechanism, and the target node is a secondary node of the MR-DC mechanism.

According to another aspect of the present disclosure, a target node is provided, wherein the target node comprises a non-transitory memory storage comprising instructions, and one or more processors in communication with the non-transitory memory storage, wherein the one or more processors execute the instructions to receive a configuration message from a source node in the radio access network, the configuration message including a handover configuration for the handover of the UE from the source node to the target node, and receive an access request message from the UE in accordance with the handover configuration.

Optionally, in some embodiments of any of the preceding aspects, the one or more processors execute further instructions to buffer a plurality of PDUs for the UE after the target node receives the plurality of PDUs from either the source node or a core network.

Optionally, in some embodiments of any of the preceding aspects, the one or more processors execute further instructions to receive a synchronization message from the source node after buffering the plurality of PDUs, the synchronization message including a sequence number of a recent PDU transmitted from the source node to the UE.

Optionally, in some embodiments of any of the preceding aspects, the synchronization message includes a rate of a data transmission from the source node to the UE.

Optionally, in some embodiments of any of the preceding aspects, the one or more processors execute further instructions to remove a first set of the plurality of PDUs in accordance with the sequence number of the recent PDU transmitted from the source node to the UE and the rate of the data transmission.

Optionally, in some embodiments of any of the preceding aspects, the access request message includes a starting sequence number, and wherein the one or more processors execute further instructions to transmit a second set of the plurality of PDUs, a smallest sequence number of the second set of the plurality of PDUs being equal to the starting sequence number.

Optionally, in some embodiments of any of the preceding aspects, the access request message further includes information indicating whether data from the source node and the target node to the UE are the same or different.

Optionally, in some embodiments of any of the preceding aspects, the information indicates that the data from the source node and the target node to the UE are different, and wherein the access request message further includes a data split pattern indicating a relation between the data from the source node to the UE and the second set of the plurality of PDUs.

Optionally, in some embodiments of any of the preceding aspects, the radio access network supports an MR-DC mechanism, and the source node is a master node of the MR-DC mechanism, and the target node is a secondary node of the MR-DC mechanism.

According to another aspect of the present disclosure, an apparatus is provided, wherein the apparatus is configured to perform some embodiments of any of the preceding aspects.

According to another aspect of the present disclosure, a communication system is provided, wherein the communication system comprises one or more apparatuses of any of the preceding aspects.

According to another aspect of the present disclosure, a non-transitory computer-readable media storing computer instructions is provided, wherein when executed by one or more processors, one or more processors perform the instructions to some embodiments of any of the preceding aspects.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
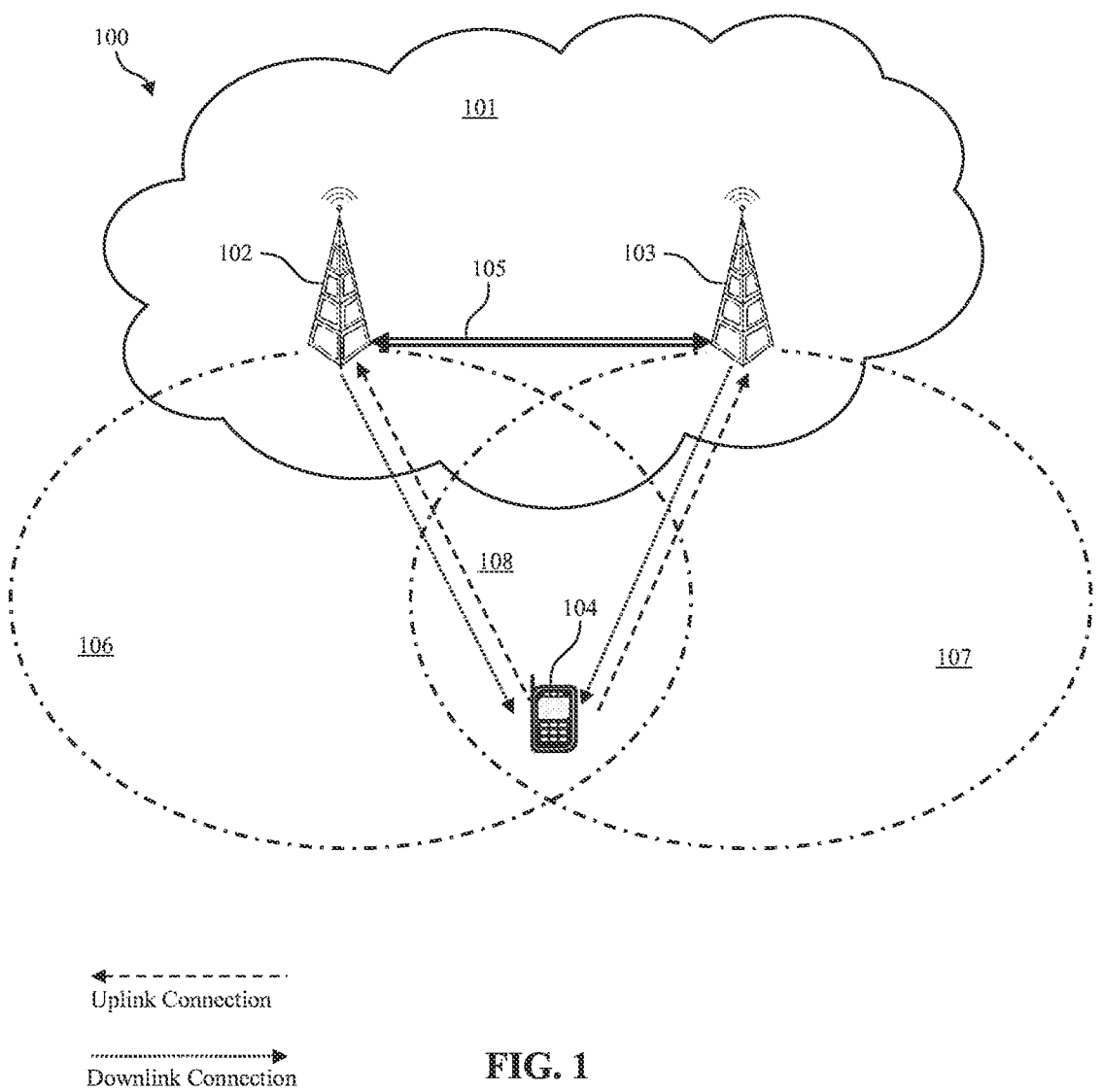
FIG. 1 illustrates an architecture of an embodiment radio access network.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

To meet requirements of Ultra-Reliable and Low-Latency Communications (URLLC), mobility management in $5^{th}$ generation (5G) new radio (NR) networks faces many challenges. A conventional handover usually occurs when a user equipment (UE) moves across a border between coverage regions of two radio access nodes. A network may instruct the UE to disconnect from a source access node ("source node") and to establish a new radio link with a target access node ("target node"). The UE starts accessing the target node as soon as the new radio link is configured, and thus the configuration process may delay the accessing process. Such a rigid handover procedure may not suit next generation NR networks. Specifically, due to employment of small cells, millimeter wave transmissions, and beaniforming techniques, each NR radio access node may have smaller coverage regions, and radio conditions in the border area may deteriorate drastically, which result in a shorter time window for the UE to utilize to perform the handover. Therefore, the UE may lose an opportunity to access the target node because of delays introduced by the configuration process. Furthermore, using a Dual Connectivity (DC) technique in 5G NR, the UE may receive traffic data from both the source node and the target node during the handover. This technique may reduce latency of the traffic by mitigating throughput fluctuation and minimizing service interruption caused by the handover. However, efficient radio resource utilization on both the source node and the target node may be difficult to achieve without proper data synchronization and buffer management mechanisms. Therefore, flexible and advanced handover techniques are desired to solve the above issues.

Disclosed herein are systems and methods supporting a much early DC based handover configuration and data preparation at the target node that permit a UE to perform deferred access to a target node, and permit a source node and a target node to synchronize data during a handover. The handover may be divided into two separate phases: a pre-configuration phase and an activation phase. During the pre-configuration phase, the UE may prepare to access a target node before moving into a coverage area of the target node. During the activation phase, the UE may access the target node in response to receiving an activation command. In some embodiments, the UE first receives a handover pre-configuration message from a source node of a radio access network. The handover pre-configuration message includes handover information of a target node of the radio access network. The handover pre-configuration message may further include an indication that instructs the UE to defer accessing the target node until the UE receives an activation command from the source node. In response to receiving the activation command, the UE transmits an access request message to the target node in accordance with the received handover information of the target node.

The target node may buffer data for the UE prior to establishing a radio link with the UE, and may manage the buffered data in accordance with received synchronization instructions. In some embodiments, such instructions are contained in a synchronization message from the source node and/or the access request message from the UE. The synchronization message indicates a recent protocol data unit (PDU) transmitted from the source note to the UE. The access request message may include a PDU sequence number that indicates from which PDU a data transmission from the target node to the UE starts. The access request message may further include information indicating whether data from the source node and the target node to the UE are different or the same. These and other aspects of this disclosure are discussed in greater detail as below.

FIG. 1 is an embodiment of a radio access network 100. The radio access network 100 includes a source radio access node 102 having a coverage area 106, a target radio access node 103 having a coverage area 107, and a UE 104. Source node 102 and target node 103 have an overlapping coverage area 108. As shown, each node may establish uplink (dashed line) and/or downlink (dotted line) connections with UE 104, which serve to carry signals from UE 104 to each node and vice-versa. Signals carried over the uplink/downlink connections may include traffic data and reference signals. Source node 102 and target node 103 may communicate with each other via an Xn interface 105. Both of source node 102 and target node 103 may be connected to a core network (not shown) via NG interfaces. It should be noted that an NG interface may refer to an interface between a 5G core network and a gNB. As used herein, the term "radio access node" or "node" refers to any component (or collection of components) configured to provide wireless access to a network, such as a base station, a cell, a Transmit and Receive Point (TRP), an enhanced Node B (eNB), a next (fifth) generation (5G) NodeB (gNB), a macro-cell, a femtocell, a Wi-Fi access point (AP), or other wirelessly enabled devices. As used herein, the term "UE" refers to any component (or collection of components) capable of establishing a wireless connection with a radio access node, such as a mobile device, a mobile station (STA), and other wirelessly enabled devices. Source node 102 and target node 103 may provide wireless access in accordance with one or more wireless communication protocols, e.g., 5G NR, long term evolution (LTE), LTE advanced (LTE-A), High Speed Packet Access (HSPA), Wi-Fi 802.11a/b/g/n/ac, etc. In some embodiments, the radio access network too may comprise various other wireless devices, such as relays, low power nodes, etc.

A conventional handover procedure is usually triggered when a UE moves across a border between coverage areas of a source node and a target node (e.g., the border area 108 in FIG. 1). The time it takes for the UE to configure and prepare for the handover may introduce extra delay. In situations where the UE has a high mobility speed and the target node has a small coverage region, by the time a handover configuration on the UE side is completed, the UE may have already traveled away from the target node (e.g., the UE moves out of the coverage area 107 in FIG. 1). Since radio conditions between the UE and the target node may deteriorate, the UE's access to the target node might fail, which will cause a handover failure and increase latency of communications between the UE and the network.

In embodiment handover techniques, a source node may pre-configure a UE for a handover earlier than the conventional method. For example, the UE may receive a handover pre-configuration before the UE moves into the border area (e.g., inside area 106 but outside of area 108 in FIG. 1). Then the UE may finish the handover pre-configuration, and may defer accessing the target node until receiving an activation command from the source node. The source node may transmit the activation command to the UE when detecting that the UE is located within the border area 108. Now because the UE has finished the handover configuration, it can promptly access the target node without suffering any further delay. The UE's handover to the target node will have a much higher success rate because the UE is still inside the coverage area 107 of the target node. Handover methods with pre-configurations are discussed in a Patent Cooperation Treaty (PCT) Application PCT/CN2017/115654, which is incorporated by reference herein as if reproduced in its entirety.

Figure 2:
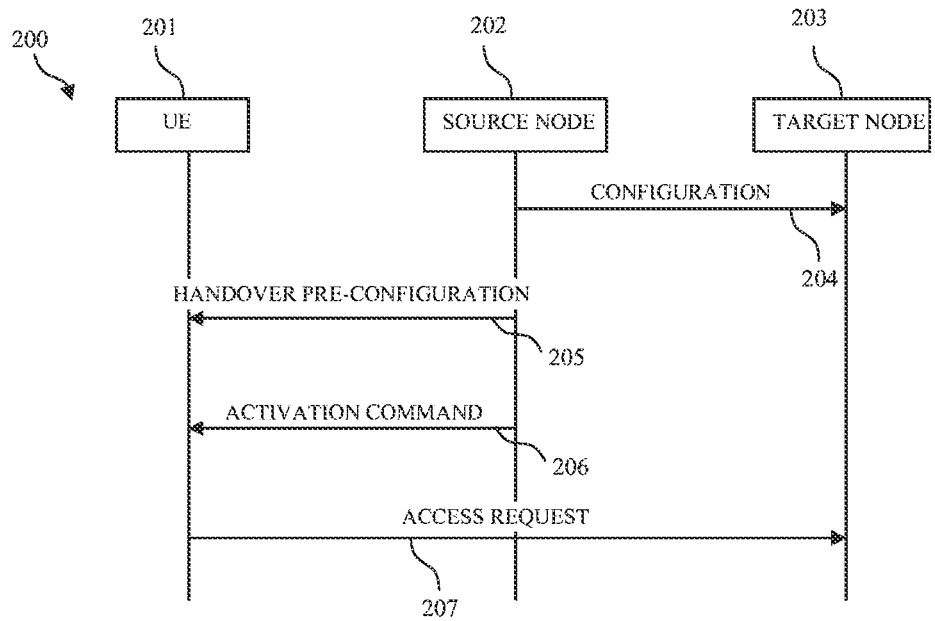
FIG. 2 is a message sequence chart of an embodiment handover method.

FIG. 2 is an embodiment message sequence chart of a method 200 for a handover in a radio access network. The radio access network includes a UE 201, a source node 202, and a target node 203. Prior to step 204, UE 201 may be connected with source node 202 in both control plane and user plane, and thus may communicate signaling messages and both uplink and downlink traffic data with source node 202. At step 204, source node 202 selects target node 203 as a target node of the handover, and sends a configuration message to target node 203. Target node 203 may configure and prepare itself for the handover upon receiving the configuration message. At step 205, source node 202 transmits a message, for example, a handover pre-configuration message, to UE 201. The message may include information indicating the UE how to configure itself to get prepared to be served by the target node 203 in the future. For example, the handover pre-configuration message includes handover information of target node 203. After receiving the handover pre-configuration message, UE 201 may configure itself for the handover in accordance with the handover information. At step 206, source node 202 sends an activation command to UE 201. The activation command may trigger UE 201 to access the target node 203. At step 207, in response to receiving the activation command, UE 201 may attempt to establish a radio link with target node 203 by transmitting an access request message to target node 203.

The configuration message transmitted from source node 202 to target node 203 indicates a request from source node 202 to handover UE 201 to target node 203. Optionally, the configuration message includes information indicating the target node 203 how to configure itself to get prepared to serve the UE 201. The configuration message may include identification (ID) of UE 201. The configuration message may also include security key configuration of UE 201 and quality of service (QoS) information of traffic data that UE 201 is transmitting or receiving, or is planning to transmit or receive. The configuration message may further include an indication that enables or disables pre-configuration of target node 203. If the indication in the configuration message indicates that pre-configuration of target node 203 is enabled, then after target node 203 completes the handover configuration in accordance with the configuration message, target node 203 does not transmit data to UE 201 until it receives the access request message from UE 201.

After receiving the configuration message, target node 203 may evaluate if it has capability to provide service to UE 201. If it can support UE 201, it may pre-configure itself for the handover. For example, target node 203 may allocate resources or schedule uplink transmission opportunities for UE 201. Target node 203 may send a configuration acknowledgement to source node 202. The configuration acknowledgement may include beam information, frequency, and a resource allocated by target node 203.

Source node 202 may forward the above information contained in the configuration acknowledgement to UE 201 through the handover pre-configuration message. UE 201 may use the above information to access target node 203. The configuration message and the configuration acknowledgement may be transmitted via an Xn interface between source node 202 and target node 203.

The handover pre-configuration message transmitted from source node 202 to UE 201 may include an indication that instructs UE 201 to defer accessing target node 203 until UE 201 receives the activation command. If the indication in the handover pre-configuration message indicates that pre-configuration/deferred access is enabled, then UE 201 defers transmitting the access request message to target node 203 until UE 201 receives the activation command. If the indication in the handover pre-configuration message indicates that pre-configuration/deferred access is disabled, then UE 201 may follow the conventional handover procedure and transmit the access request message to target node 203 when it finishes the handover configuration. The indication in the handover pre-configuration message may make the embodiment method compatible with a UE that does not support pre-configuration and deferred access. In some situations where the source node determines that a conventional handover procedure may perform for certain interruption and delay tolerable applications, the source node may choose to disable the pre-configuration and deferred access via carrying the indication in the handover pre-configuration message to save the network resources. In one embodiment, UE 201 may defer transmission of uplink data until it receives the activation command.

In one embodiment, UE 201 may send a handover pre-configuration complete message back to source node 202 after finishing the handover pre-configuration. The handover pre-configuration message and the handover pre-configuration complete message may be radio resource control (RRC) signaling messages. For example, the handover pre-configuration message is an RRC Connection Reconfiguration message defined in $3^{rd}$ Generation Partnership Project (3GPP) protocols, and the handover pre-configuration complete message is an RRC Connection Reconfiguration Complete message defined in the same protocols. The handover information in the handover pre-configuration message may include at least one of beam information, frequency, and a resource allocated by target node 203.

When source node 202 determines that it is the right time for UE 201 to access target node 203, source node 202 may transmit the activation command to UE 201, which triggers UE 201 to enter into the activation phase. The activation command may include a protocol data unit (PDU) sequence number (SN), which indicates from which PDU a data transmission from target node 203 to UE 201 starts. In one embodiment, the activation command is carried by a medium access control (MAC) control element (CE) of a MAC layer PDU. Alternatively, the activation command may be carried by physical layer downlink control information (DCI). For example, a new type of DCI may be defined to early the activation command using a number of bits (e.g., 3 bytes).

In one embodiment, upon receiving the activation command, UE 201 initiates a random access procedure to establish a radio link with target node 203. UE 201 may send random access preamble to target node 203. The random access procedure is successful and a random access channel (RACH) is established between UE 201 and target node 203 after UE 201 receives random access response from target node 203. Then UE 201 may transmit the access request message which includes the PDU sequence number UE 201 has received in the activation command. UE 201 may establish the RACH and transmit the access request message in accordance with the handover information in the handover pre-configuration message. The random access procedure may be either contention based or non-contention (or contention free) based depending on the beam information and the resource allocated by target node 203, which are included in the handover information. For example, in a contention based access, UE 201 may transmit a TX preamble from a poll before transmitting the access request message; in a contention free access, UE 201 may transmit a TX preamble dedicated to it before transmitting the access request message. The resource allocated by target node 203 may either be a dedicated resource or a common resource.

Alternatively, in order to access or establish a radio link with target node 203, UE 201 may transmit the access request message to target node 203 directly through a RACH-less procedure as defined in 3GPP standards. UE 201 may perform the RACH-less procedure in accordance with the handover information in the handover pre-configuration message. UE 201 may start blind decoding for the information on a physical downlink control channel (PDCCH) from target node 203 to UE 201 after transmitting the access request message. In one embodiment, UE 201 may start blind decoding information on a PDCCH from the target node 203 after transmitting the access request message.

Figure 3:
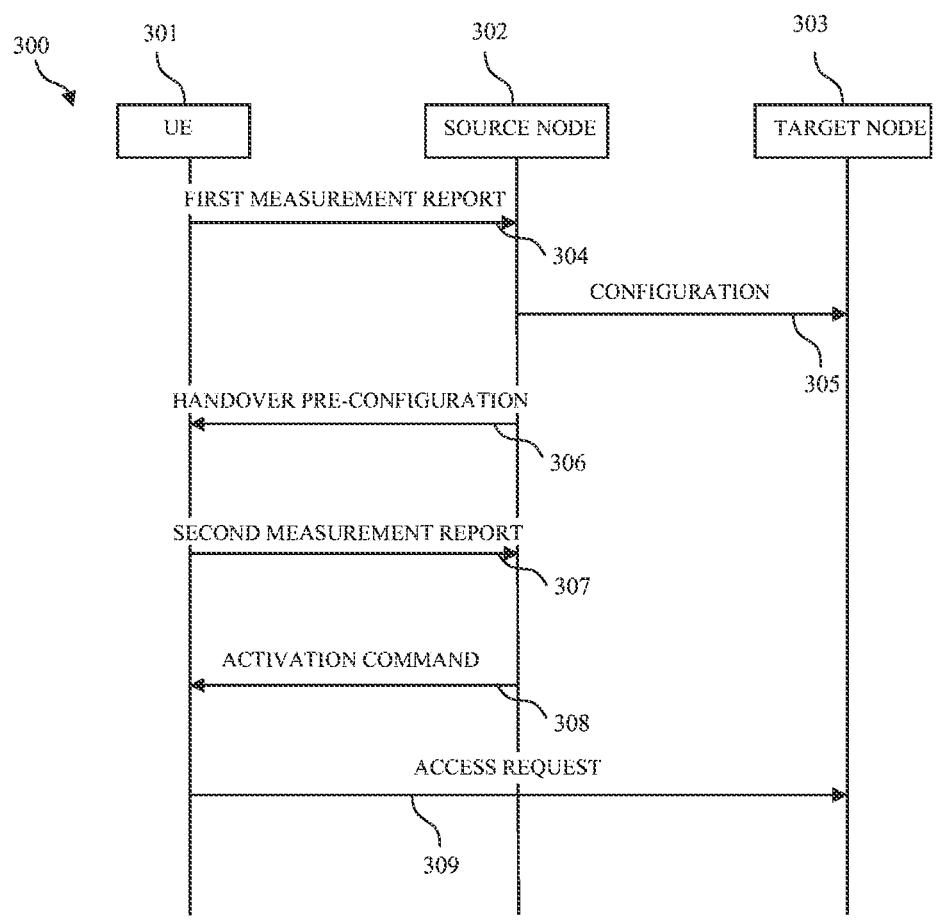
FIG. 3 is a message sequence chart of an embodiment handover method including measurement reports from a user equipment (UE) to a source node.

In some embodiments, a source node may determine a target node of a handover, and when to send a configuration message, a handover pre-configuration message, or an activation command in accordance with measurement reports that the source node receives from a UE. FIG. 3 is an embodiment message sequence chart of a method 300 for a handover of UE 301 from source node 302 to target node 303. At step 304, UE 301 transmits a first measurement report to source node 302. The first measurement report may include power of signals (e.g., Common Pilot Channel (CPICH) Reference Signal Received Power (RSRP)) that UE 301 receives from neighboring radio access nodes, which include a handover target candidate target node 303. Source node 302 may select target node 303 as a target for the handover of UE 301 in accordance with measurement results of target node 303. Source node 302 may evaluate measurement results of target node 303 and determine when to transmit a configuration message to target node 303 (step 305), and when to transmit a handover pre-configuration message to UE 301 (step 306). At step 307, after receiving the handover pre-configuration message, UE 301 transmits a second measurement report to source node 302, which includes physical layer beam level measurement results of source node 302 and target node 303. At step 308, in accordance with the second measurement report, source node 302 determines timing for UE 301 to access target node 303, and then transmits an activation command to UE 301 in accordance with the determined timing. At step 309, UE 301 transmits an access request message to target node 303 in response to receiving the activation command.

In one embodiment, UE 301 may monitor radio conditions of the neighboring radio access nodes and may report measurement results by transmitting a series of measurement reports, which include the first measurement report and the second measurement report. The radio conditions that UE 301 monitors may include physical layer (L1) measurements of candidate beams of a neighboring radio access node. In another embodiment, each of the series of measurement reports may include beam level measurement results of the source node and the target node. The candidate beams of the neighboring radio access node may include beams of source node 302 and beams of target node 303, which may have been indicated to UE 301 through the handover pre-configuration message.

In one embodiment, RRC (L3) level measurements may be used if both beam level measurements and cell level measurement are required by source node 302, which may bring longer delay due to extra L3 processing and filtering. In another embodiment, L1 measurement may be used per beam basis with shorter filtering time and shorter delay.

In one embodiment, source node 302 transmits the activation command to UE 301 when the second measurement report indicates that a radio link condition between UE 301 and source node 302 is worse than a first threshold. In another embodiment, source node 302 may transmit the activation command to UE 301 when the second measurement report indicates that a radio link condition between UE 301 and target node 303 is better than a second threshold. Source node 302 may determine whether a radio link condition between UE 301 and source node 302 is worse than a first threshold or a radio link condition between UE 301 and target node 303 is better than a second threshold.

In one embodiment, the first measurement report and the second measurement report may be RRC signaling messages. Alternatively, a lower layer signaling (e.g., an MAC PDU or an L1 signaling message) may be used to carry the measurement report to reduce delays that may be introduced by RRC layer filtering and reporting.

Even though FIG. 3 shows the first measurement report and the second measurement report, it should be appreciated that not both of them are required in the handover procedure. In one embodiment, only one of the first and second measurement reports is used. In another embodiment, none of these two measurement reports is used and a timer or some other mechanisms may be used to trigger transmission of the configuration message or the activation command. Alternatively, a combination of measurement reports and other triggering mechanisms (e.g., a timer) may also be used during the handover procedure.

Figure 4:
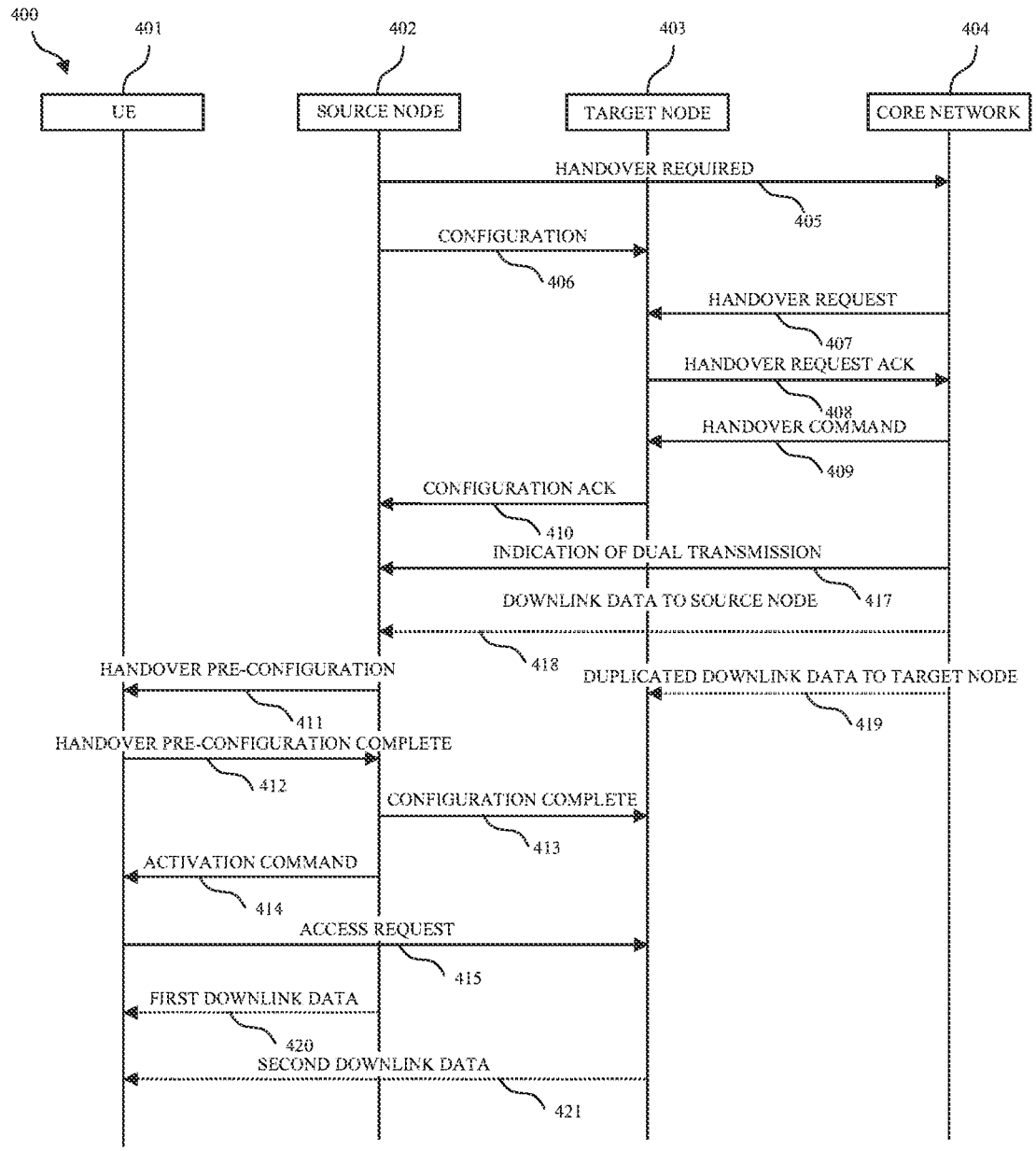
FIG. 4 is a message sequence chart of an embodiment handover method using a multi-radio dual connectivity (MR-DC) mechanism.

Using the Dual Connectivity (DC) technique, a source node and a target node may both communicate traffic data with a UE during embodiment handover procedures. FIG. 4 is an embodiment message sequence chart of a method 400 for a handover procedure, during which UE 401 receives downlink traffic data from core network 404 through both source node 402 and target node 403. Source node 402 and target node 403 belong to a radio access network that supports a multi-radio dual connectivity (MR-DC) mechanism. Source node 402 may be referred to as a master node of the MR-DC mechanism that serves a primary cell, and target node may be referred to as a secondary node of the MR-DC mechanism that serves a secondary cell. Source node 402 and target node 403 are connected to core network 404 via respective NG interfaces. To enable the DC technique and reduce packet delays, core network 404 may first deliver downlink UE data to target node 403 before a radio link between UE 401 and target node 404 is established.

Specifically, before the handover procedure, UE 401 may be connected with source node 402 in both control plane and user plane. Traffic data communicated between UE 401 and source node 402 may be carried over a master cell group (MCG) radio bearer. When source node 402 determines to trigger the handover, it sends a handover required message to core network 404 at step 405, and a configuration message to target node 403 at step 406. At step 407, core network 404 responds by sending a handover request message to target node 403. By transmitting a handover request acknowledgement message to core network 404 at step 408, target node 403 notifies core network 404 that target node 403 is capable of serving as a target node for this handover. At step 409, core network 404 transmits a handover command message to target node 403. At step 410, target node 403 transmits a configuration acknowledgement message to source node 402 upon receiving the handover command message.

After receiving the handover request acknowledgement message from target node 403, core network 404 may notify source node 402 the start of dual downlink transmission to both source node 402 and target node 403 by transmitting an indication of dual transmission to source node 402 at step 417. At step 418, core network 404 sends downlink data to source node 402. At step 419, core network 404 sends duplicated downlink data to target node 403. It should be noted that traffic data transmissions are indicated by dotted lines (e.g., steps 418 and 419), and signaling transmissions are indicted by solid lines (e.g., steps 405-410).

Similar to steps in FIG. 2, at step 411, source node 402 transmits a handover pre-configuration message to UE 401 upon receiving the configuration acknowledgement message. After UE 401 finishes the handover configuration, it sends a handover pre-configuration complete message to source node 402 at step 412. At step 413, source node 402 transmits a configuration complete message to target node 403 upon receiving the handover pre-configuration complete message. At step 414, source node 402 transmits an activation command to UE 401 requesting UE 401 to access target node 403. At step 415, UE 401 transmits an access request message to target node 403 upon receiving the activation command. At step 420, source node 402 sends first downlink data to UE 401. At step 421, target node 403 sends second downlink data to UE 401 upon receiving the access request message.

It should be appreciated that in this disclosure, a message sequence chart shows illustrative implementation of one or more embodiments. But unless specifically indicated, messages may not take place exactly the same sequence they occur in the chart. For example, FIG. 4 shows that step 420 is after step 415, but step 420 may occur at any place in the chart because of an ongoing downlink transmission from source node 402 to UE 401 during the handover procedure.

The activation command may include information indicating whether data from the source node and the target node to the UE are different or the same. For example, the activation command may include a dual connectivity transmission mode. The dual connectivity transmission mode may be either "Duplicated" or "Split" "Duplicated" means UE 401 will receive the same and duplicated data from source node 402 and target node 403—the first downlink data and the second downlink data may be the same. "Split" transmission mode means source node 402 and target node 403 each transmits a portion of UE 401's traffic data—the first downlink data and the second downlink data may be different. In this case, the activation command may further include a data split pattern indicating a relation between the first downlink data and the second downlink data.

In one embodiment, the access request message contains a primary secondary cell (PSCell) activation command for activating target node 403 as the secondary node of the MR-DC mechanism. The access request message may also include the dual connectivity transmission mode or the data split pattern (for the "Split" transmission mode), so that target node 403 knows what part of the duplicated downlink data it receives from core network 404 should be transmitted to UE 401.

The first downlink data and the second downlink data may both include a plurality of PDUs (e.g., Packet Data Convergence Protocol (PDCP) layer PDUs). The second downlink data may include the PDU with the same PDU sequence number included in the activation command or the access request message. For the "Duplicated" transmission mode, UE 401 combines the first downlink data and the second downlink data through duplicated PDU decoding and re-sequencing in accordance with the PDU sequence number and the decoded PDUs. UE 401 may decode duplicated PDUs independently. As long as one PDU is successfully decoded, UE 401 may take it for re-sequencing. Then UE 401 may pack that decoded PDU with other decoded PDUs, re-sequence them in accordance with their sequence numbers, and pass the re-sequenced PDUs to an upper layer in the right order. For the "Split" transmission mode, UE 401 combines the first downlink data and the second downlink data in accordance with the PDU sequence number and the data split pattern.

After the target node receives the duplicated downlink data from the core network, the target node may have to store the data in its buffer. Before a radio link between the UE and the target node is established, the data may have to stay in the buffer of the target node. But some of the buffered data may not be needed if the same data have been transmitted to the UE by the source node. Therefore, the source node may routinely update its transmission status to the target node so that the target node can synchronize with the target node and manage the buffer of the target node more efficiently.

Figure 5:
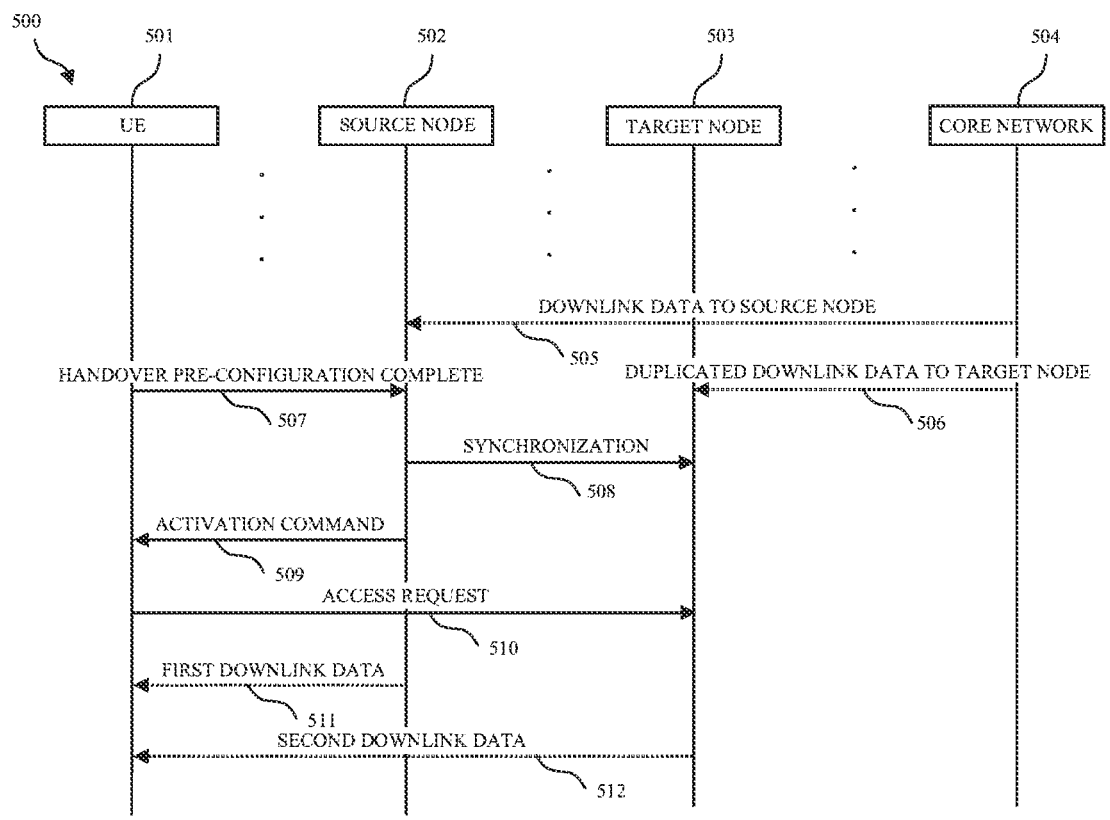
FIG. 5 is a message sequence chart of an embodiment handover method using a MR-DC mechanism and data synchronization.

FIG. 5 is a message sequence chart of an embodiment handover method using a MR-DC mechanism and data synchronization. Steps similar to steps 405-410 and 417 in FIG. 4 may occur before step 505 in the embodiment illustrated by FIG. 5. Upon receiving a handover pre-configuration complete message from UE 501, source node 502 may assume that target node 503 already receive duplicated downlink data from core network 504, thus may transmit a synchronization message to target node 503. The synchronization message may indicate a recent PDU transmitted from source node 502 to UE 501. The synchronization message may include a rate of a data transmission from source node 502 to UE 501. Although only one synchronization message is illustrated in FIG. 5, it should be appreciated that source node 502 may transmit a series of synchronization messages either periodically or irregularly. For example, as the downlink transmission from source node 502 to UE 501 continues, a new synchronization message will be transmitted from source node 502 to target node 503 in order to notify latest status of the downlink transmission. Steps 509-512 are similar to steps 414, 415, 420, and 421 in FIG. 4.

Figure 6:
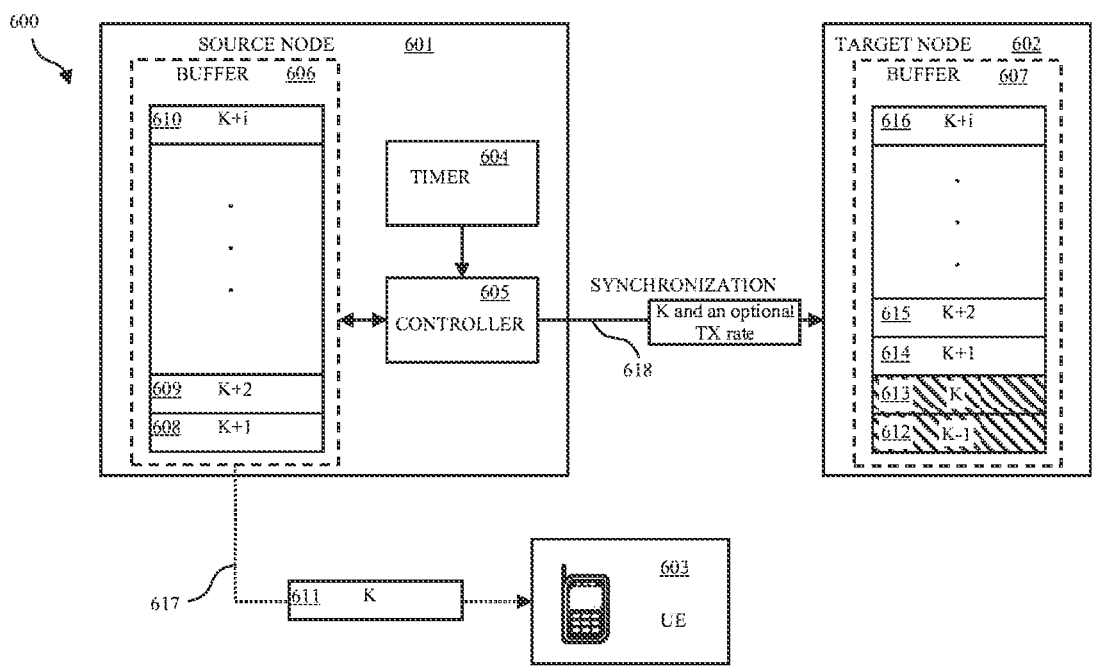
FIG. 6 is an illustration of an embodiment data synchronization method prior to downlink transmission from a target node to a UE.

FIG. 6 is an illustration of an embodiment data synchronization method prior to downlink transmission from target node 602 to UE 603. Source node 601 may include a buffer unit 606, a timer unit 604 and a control unit 605. Source buffer 606 stores a plurality PDUs including PDU K+1 (K+1 is the sequence number of this PDU), PDU K+2, ..., PDU K+i. Source node 601 has just successfully transmitted PDU K to UE 603. Thus, source node 601 may send a synchronization message 618 to target node 602. Synchronization message 618 may include a sequence number PDU K indicating that source node 601 already sent PDU K or that UE 603 already received PDU K if the application allows UE 603 to acknowledge the PDU that has been successfully received. Target node 602 may store PDUs K−1, K, ..., K+i in its buffer 607. After receiving synchronization message 618 and checking the content, target node 602 realizes that it doesn't have to keep some old data in buffer 607. Therefore, target node 602 may decide to remove PDUs K−1 and K from buffer 607 instead of wasting space in buffer 607. Timer unit 604 may generate signals that triggers control unit 605 to send a synchronization message every once a while. Synchronization message may include a rate of a data transmission from source node 601 to UE 603. When target node 602 receives the rate, it may estimate PDUs that UE 603 may have received in accordance with previously received synchronization messages, even though this estimation may not be as accurate as the recent transmitted PDU sequence number.

Figure 7:
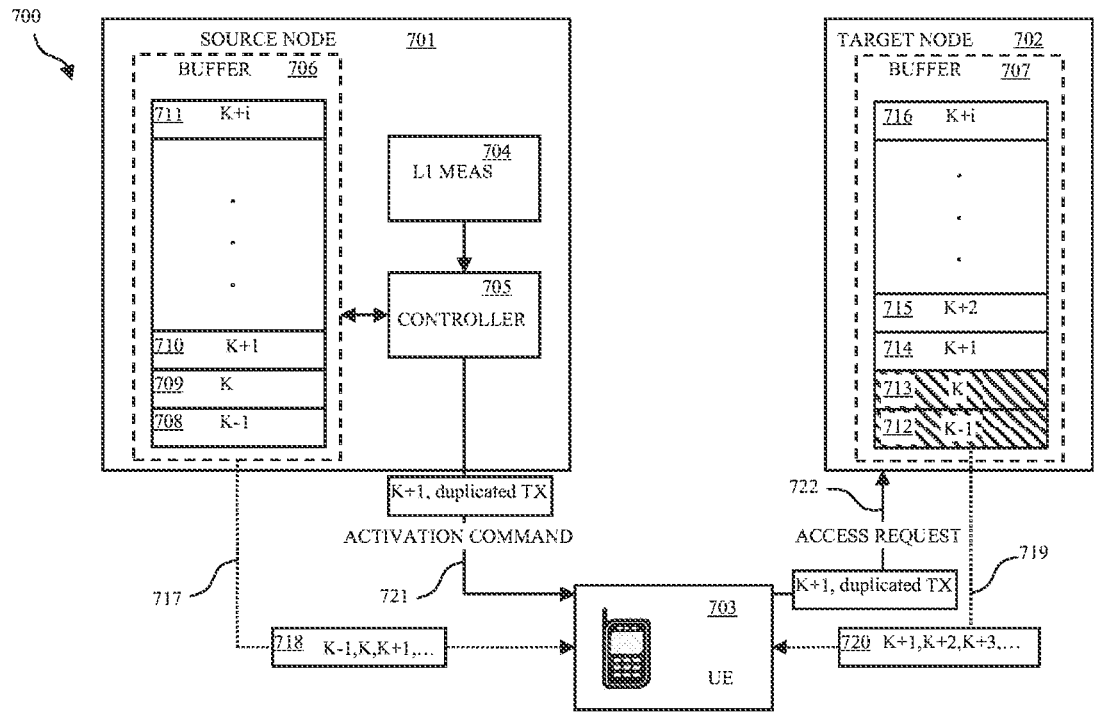
FIG. 7 is an illustration of an embodiment data synchronization method using duplicated data transmission.

FIG. 7 is an illustration of an embodiment data synchronization method using "Duplicated" data transmission. Source node 701 includes a buffer unit 706, a L1 measurement unit 704 and a control unit 705. Source buffer 706 stores a plurality PDUs including PDU K−1, PDU K, PDU K+1, PDU K+2, . . . , PDU+i. Target node 702 includes a buffer unit 707 and the PDUs stored in target buffer 707 are synchronized with source buffer 706. Source node 701 first successfully transmitted PDUs K−1 and K to UE 703. L1 measurement unit 704 may generate a beam level measurement report, which triggers control unit 705 to transmit an activation command 721 to UE 703. Activation command 721 includes information indicating that a downlink data transmission from target node 702 to UE 703 should start from transmission of PDU K+1. Activation command 721 may also include a dual transmission mode which indicates that "Duplicated" data transmission is used. Upon receiving activation command 721, UE 703 sends an access request message 722 to target node 702. Access request message 722 includes information of the recent transmitted PDU (K+1) and the dual transmission mode ("Duplicated") extracted from activation command 721. Target node 702 receives and decodes the above information from access request message 722, and then removes old PDUs K and K−1 from target buffer 707. Then target node 702 transmits remaining PDUs in target buffer 707 to UE 703, starting with PDU K+1. Duplicated PDUs K+1, K+2, . . . , K+i are also transmitted from source node 701 to UE 703.

Figure 8:
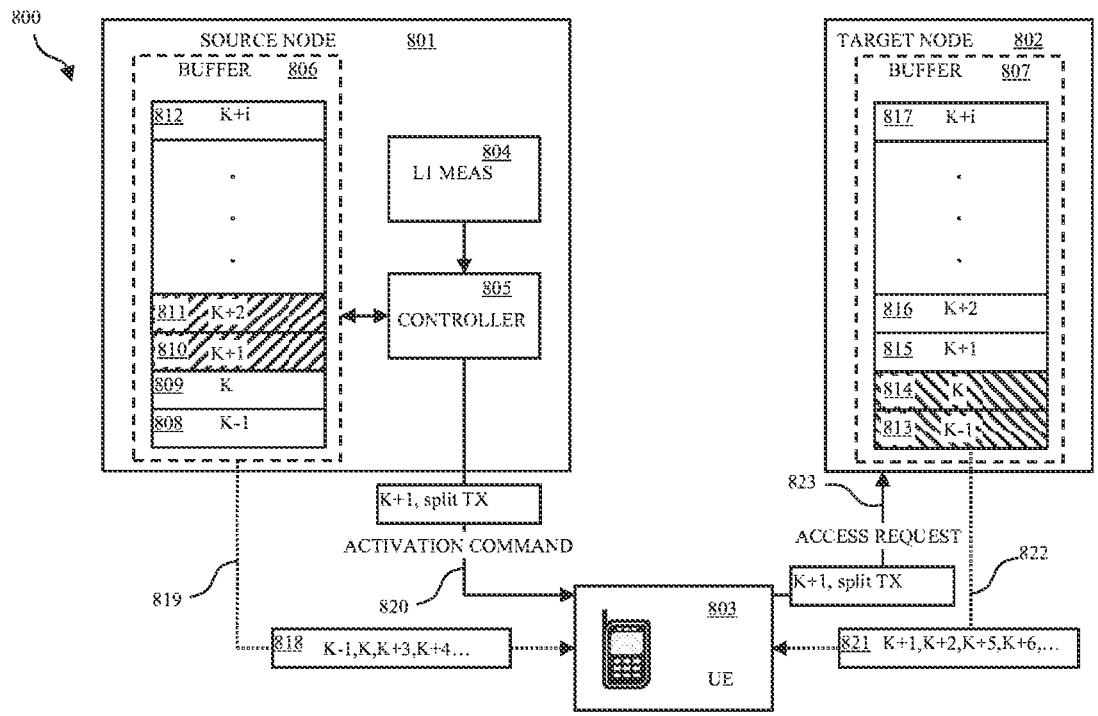
FIG. 8 is an illustration of an embodiment data synchronization method using split data transmission.

FIG. 8 is an illustration of an embodiment data synchronization method using split data transmission. Source node 801 includes a buffer unit 806, a L1 measurement unit 804 and a control unit 805. Source buffer 806 stores a plurality PDUs including PDU K−1, PDU K, PDU K+1, PDU K+2, . . . , PDU K+i. Target node 802 includes a buffer unit 807 and the PDUs stored in target buffer 807 are synchronized with source buffer 806. Source node 801 first successfully transmitted PDUs K−1 and K to UE 803. L1 measurement unit 804 may generate a measurement report, which triggers control unit 805 to transmit an activation command 820 to UE 803. Activation command 820 includes information indicating that a downlink data transmission from target node 802 to UE 803 should start from transmission of PDU K+i. Activation command 820 may also include a dual transmission mode which indicates that "Split" data transmission is used. Activation command 820 also includes a data split pattern. In this example, the data split pattern instructs target node 802 to transmit the first two PDUs including the starting PDU K+1, and PDU K+2, skip the next two PDUs K+3 and K+4, transmit PDUs K+5 and K+6, and so on. Upon receiving activation command 820, UE 803 transmits access request message 803 to target node 802, which includes the content of activation command 820. Target node 802 then removes old PDUs K, K−1 (which are already transmitted from source node 801 to UE 803) and PDUs K+3, K+4 (which are not target node 802's transmission responsibility due to the data split pattern) from target buffer 807. After that, target node 802 transmits remaining PDUs (K+1, K+2, K+5, etc.) in target buffer 807 to UE 803.

On the other hand, the other portion of PDUs (K+3, K+4, K+7, etc.) are transmitted from source node 801 to UE 803.

Figure 9:
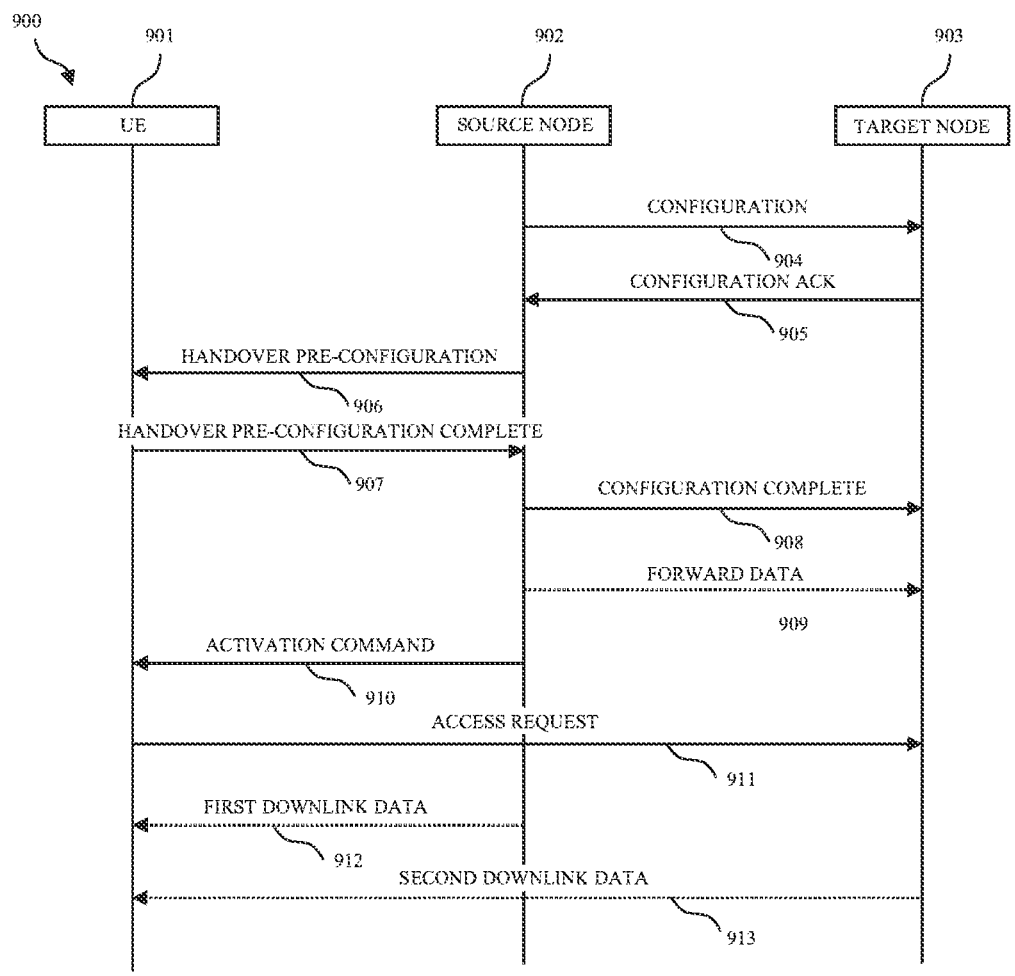
FIG. 9 is a message sequence chart of an embodiment handover method using a MR-DC mechanism and data forwarding from a source node to a target node.

FIG. 9 is a message sequence chart of an embodiment handover method using a MR-DC mechanism and data forwarding from a source node to a target node. In order to involve the core network for preparing the handover, the handover process needs to be started much earlier which require a more powerful mobility prediction capabilities in the network. In addition early enabling additional data bearer to the target node will occupy more network resources. Therefore, instead of directly receiving duplicated downlink data from a core network, target node 903 may receive downlink data directly from source node 902. In FIG. 9, prior to the handover, UE 901 may be connected with source node 902 in both control plane and user plane. Traffic data communicated between UE 901 and source node 902 may be carried over a MCG radio bearer. After source node 902 determines to trigger the handover, it sends a configuration message to target node 903 at step 904. At step 905, target node 903 transmits a configuration acknowledgement message to source node 902. At step 906, source node 902 transmits a handover pre-configuration message to UE 901 upon receiving the configuration acknowledgement message. After finishing the handover pre-configuration, UE 901 sends a handover pre-configuration complete message to source node 902 at step 907. At step 908, source node 902 transmits a configuration complete message to target node 903 upon receiving the handover pre-configuration complete message. At step 909, source node 902 forwards data to target node 903. At step 910, source node 902 transmits an activation command to UE 901 requesting UE 901 to access target node 903. At step 911, UE 901 transmits an access request message to target node 903 upon receiving the activation command. At step 912, source node 902 sends first downlink data to UE 901. At step 913, target node 903 sends second downlink data to UE 901 upon receiving the access request message.

In one embodiment, the data that source node 902 forwards to target node 903 may be identical to the downlink data that source node 902 plans to transmit to UE 901, which may be stored in source node 902's buffer. Alternatively if an MR-DC mechanism with "Split" data transmission mode is used, source node 902 may forward only a portion of the downlink data that it plans to transmit to UE 901 in accordance with a data split pattern. For similar reasons, the first downlink data and the second downlink data transmitted respectively from source node 902 and target node 903 may either be different or the same, and their content may be determined in accordance with the dual data transmission mode and the data split pattern of the MR-DC mechanism being used during this handover procedure.

Figure 10:
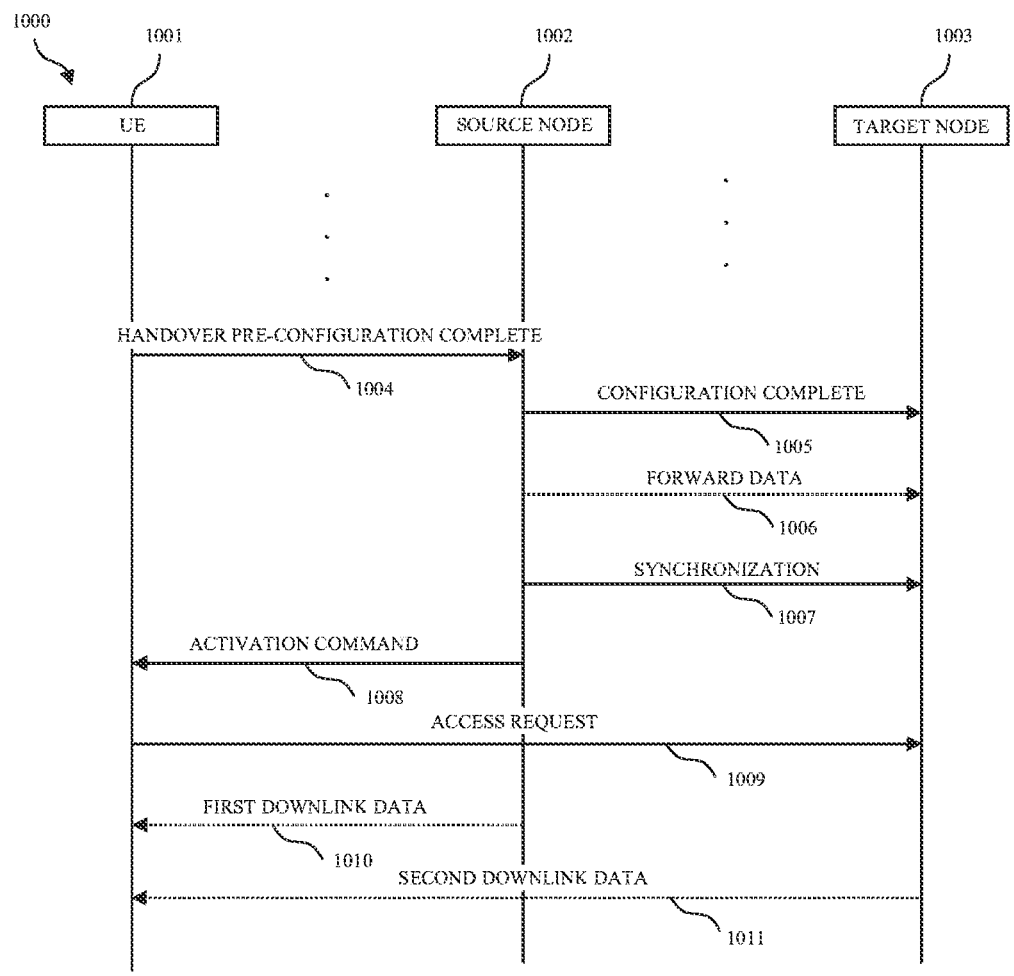
FIG. 10 is a message sequence chart of an embodiment handover method using a MR-DC mechanism, data forwarding from a source node to a target node, and data synchronization.

FIG. 10 is a message sequence chart of an embodiment handover method using a MR-DC mechanism, data forwarding from a source node to a target node, and data synchronization. It should be appreciated that steps similar to steps 904-906 in FIG. 9 may occur before step 1004 in the embodiment illustrated by FIG. 10. Steps 1004-1006 and 1008-1011 may be similar to steps 907-909 and 910-913 in FIG. 9. After forwarding data to target node 903, source node 902 may assume that target node 903 already have stored the data in target node 903's buffer, thus may transmit a synchronization message to target node 903. The synchronization message may indicate a recent PDU transmitted from source node 902 to UE 901. The synchronization message may include a rate of a data transmission from source node 902 to UE 901. Although only one synchronization message is illustrated in FIG. 10, it should be appreciated that source node 902 may transmit a series of synchronization messages either periodically or irregularly.

Figure 11:
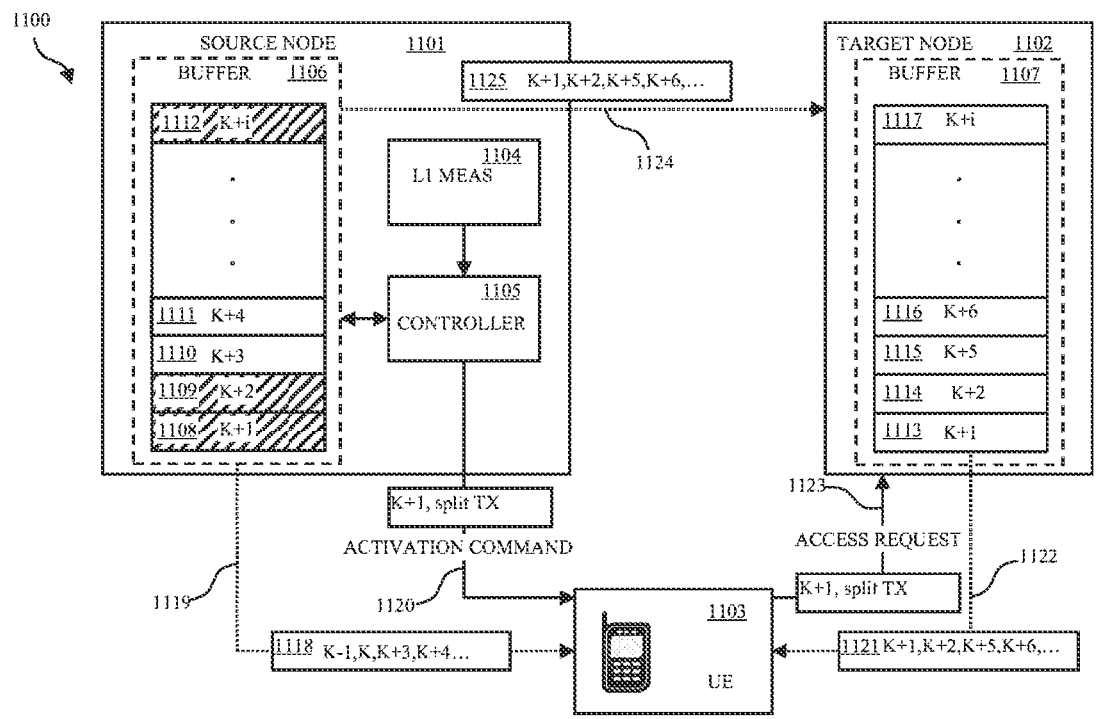
FIG. 11 is an illustration of an embodiment data synchronization method with data forwarding from a source node to a target node.

FIG. 11 is an illustration of an embodiment data synchronization method with data forwarding from a source node to a target node. Source node 1101 includes a buffer unit 1106, a L1 measurement unit 1104 and a control unit 1105. Source buffer 1106 stores a plurality PDUs including PDU K−1, PDU K, PDU K+1, PDU K+2, . . . , PDU K+i. Source node 1101 first successfully transmitted PDUs K−1 and K to UE 1103. During the handover procedure, source node 1101 forwards PDUs K+1, K+2, K+5, K+6, . . . , K+i to target node 1102. Target node 1102 stores these PDUs in its buffer unit 1107. Activation command 1120 includes information indicating that a downlink data transmission from target node 1102 to UE 1103 should start from transmission of PDU K+1. Activation command 1120 may also include a dual transmission mode which indicates that "Split" data transmission is used. Activation command 1120 also includes a data split pattern. In this example, the data split pattern instructs target node 1102 to transmit the first two PDUs including the starting PDU K+1, and PDU K+2, skip the next two PDUs K+3 and K+4, transmit PDUs K+5 and K+6, and so on. Upon receiving activation command 1120, UE 1103 transmits access request message 1123 to target node 1102, which includes the content of activation command 1120. Target node 1102 then transmits PDUs (K+1, K+2, K+5, etc.) in target buffer 1107 to UE 1103. On the other hand, the other portion of PDUs (K+3, K+4, K+7, etc.) are transmitted from source node 1101 to UE 1103. In one embodiment, source node 1101 may remove the PDUs (K+1, K+2, K+5, K+6, . . . , K+i) that have been forwarded to target node 1102 from buffer 1106. Alternatively, source node 1101 may choose to keep these PDUs in buffer 1106 until successful transmission of these PDU to UE 1103 is acknowledged.

Figure 12A:
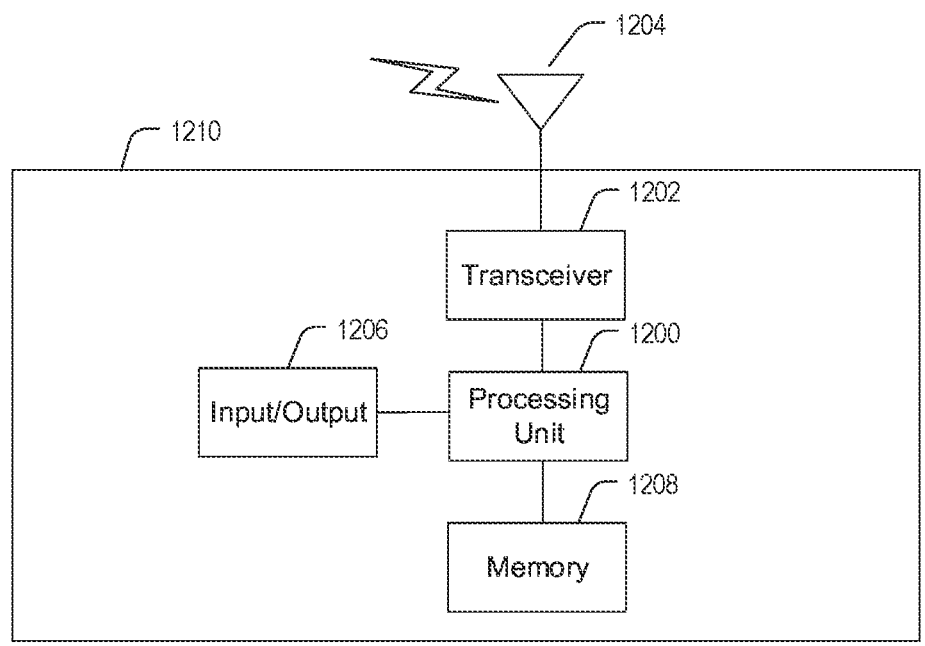
FIG. 12A illustrates block diagrams of an embodiment UE.
Figure 12B:
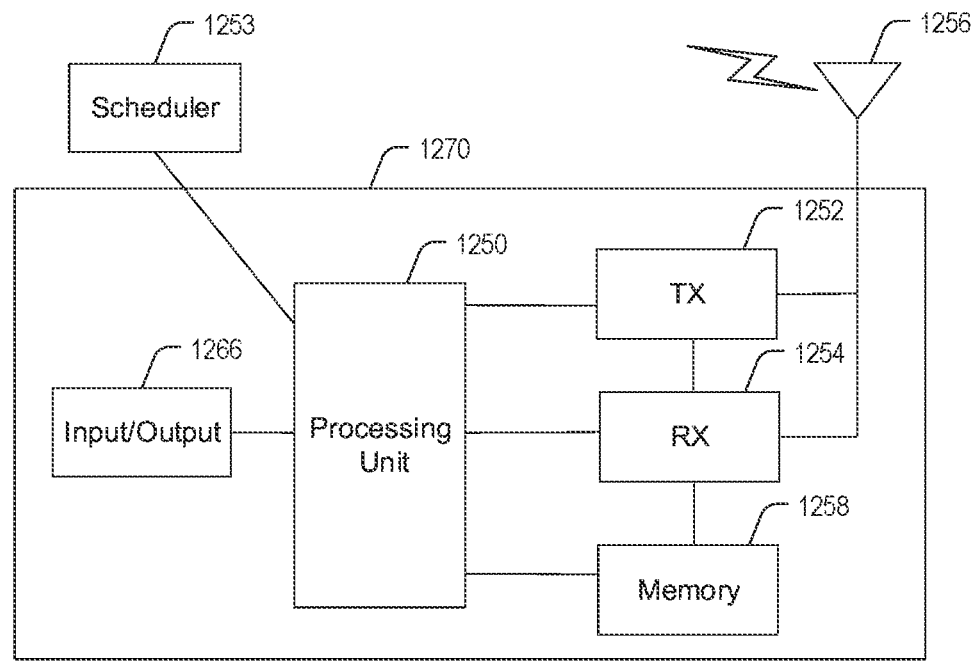
FIG. 12B illustrates block diagrams of an embodiment radio access node.

FIGS. 12A and 12B illustrate example devices that may implement the methods and teachings according to this disclosure. In particular, FIG. 12A illustrates an example UE 1210, and FIG. 12B illustrates an example radio access node 1270.

As shown in FIG. 12A, the UE 1210 includes at least one processing unit 1200. The processing unit 1200 implements various processing operations of the UE 1210. For example, the processing unit 1200 could perform signal coding, data processing, power control, input/output processing, or any other functionality enabling the UE 1210 to operate in the network. The processing unit 1200 may also be configured to implement some or all of the functionality and/or embodiments described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The UE 1210 also includes at least one transceiver 1202. The transceiver 1202 is configured to modulate data or other content for transmission by at least one antenna or Network Interface Controller (NIC) 1204. The transceiver 1202 is also configured to demodulate data or other content received by the at least one antenna 1204. Each transceiver 1202 includes any suitable structure for generating signals for wireless transmission and/or processing signals received. Each antenna 1204 includes any suitable structure for transmitting and/or receiving wireless signals. One or multiple transceivers 1202 could be used in the UE 1210, and one or multiple antennas 1204 could be used in the UE 1210. Although shown as a single functional unit, a transceiver 1202 could also be implemented using at least one transmitter and at least one separate receiver.

The UE 1210 further includes one or more input/output devices 1206 or interfaces. The input/output devices 1206 permit interaction with a user or other devices in the network. Each input/output device 1206 includes any suitable structure for providing information to or receiving information from a user, such as a speaker, microphone, keypad, keyboard, display, or touch screen, including network interface communications.

In addition, the UE 1210 includes at least one memory 1208. The memory 1208 stores instructions and data used, generated, or collected by the UE 1210. For example, the memory 1208 could store software instructions or modules configured to implement some or all of the functionality and/or embodiments described above and that are executed by the processing unit(s) 1200. Each memory 1208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (Sr)) memory card, and the like. It is understood that the components as shown in FIG. 12A is for the purpose of illustration and the UE 1210 may include part or all of the components illustrated in FIG. 12A.

As shown in FIG. 12B, radio access node 1270 includes at least one processing unit 1250, at least one transmitter 1252, at least one receiver 1254, one or more antennas 1256, at least one memory 1258, and one or more input/output devices or interfaces 1266. A transceiver, not shown, may be used instead of the transmitter 1252 and receiver 1254. A scheduler 1253 may be coupled to the processing unit 1250. The scheduler 1253 may be included within or operated separately from radio access node 1270. The processing unit 1250 implements various processing operations of radio access node 1270, such as signal coding, data processing, power control, input/output processing, or any other functionality. The processing unit 1250 can also be configured to implement some or all of the functionality and/or embodiments described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit. It is understood that the components as shown in FIG. 12B is for the purpose of illustration and radio access node 1270 may include part or all of the components illustrated in FIG. 12B.

Each transmitter 1252 includes any suitable structure for generating signals for wireless transmission to one or more UEs or other devices. Each receiver 1254 includes any suitable structure for processing signals received from one or more UEs or other devices. Although shown as separate components, at least one transmitter 1252 and at least one receiver 1254 could be combined into a transceiver. Each antenna 1256 includes any suitable structure for transmitting and/or receiving wireless or wired signals. Although a common antenna 1256 is shown here as being coupled to both the transmitter 1252 and the receiver 1254, one or more antennas 1256 could be coupled to the transmitter(s) 1252, and one or more separate antennas 1256 could be coupled to the receiver(s) 1254. Each memory 1258 includes any suitable volatile and/or non-volatile storage and retrieval device(s) such as those described above in connection to the UE 1210. The memory 1258 stores instructions and data used, generated, or collected by radio access node 1270. For example, the memory 1258 could store software instructions or modules configured to implement some or all of the functionality and/or embodiments described above and that are executed by the processing unit(s) 1250.

Each input/output device 1266 permits interaction with a user or other devices in the network. Each input/output device 1266 includes any suitable structure for providing information to or receiving/providing information from a user, including network interface communications.

Figure 13:
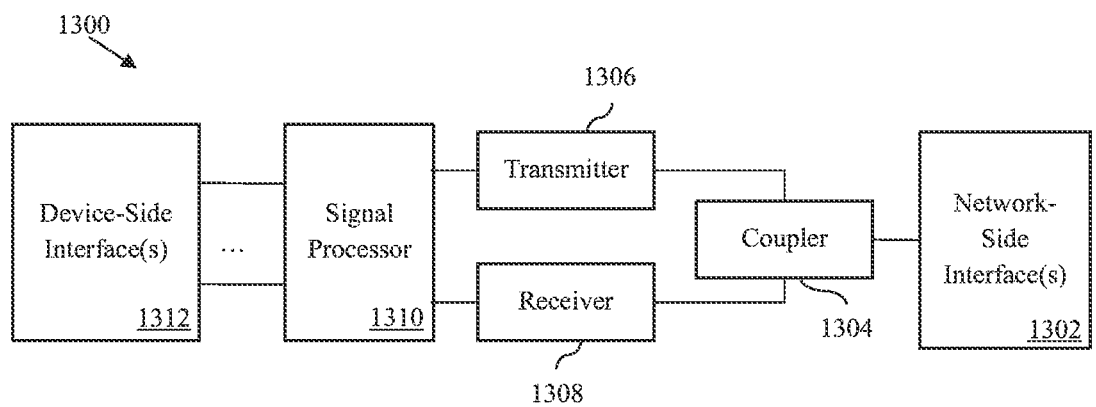
FIG. 13 illustrates a block diagram of an embodiment transceiver.

FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system, local area network (IAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocd, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disdosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, comprising:
   receiving, by a user equipment (UE), a handover pre-configuration message from a source node serving the UE in a radio access network, the handover pre-configuration message including handover information of a target node in the radio access network, the handover information in the handover pre-configuration message indicating to the UE how to configure the UE to get prepared to be served by the target node;
   receiving, by the UE, an activation command from the source node after receiving the handover pre-configuration message;
   transmitting, by the UE, an access request message to the target node in accordance with the handover information in response to receiving the activation command, wherein at least one of the activation command and the access request message includes a protocol data unit (PDU) sequence number indicating from which PDU a data transmission from the target node to the UE starts;
   receiving, by the UE, a first set of PDUs from the source node, and a second set of PDUs from the target node, a sequence number of a first PDU in the second set of PDUs being equal to the PDU sequence number; and
   combining, by the UE, the first set of PDUs and the second set of PDUs.

2. The method of claim 1, wherein the at least one of the activation command and the access request message further includes information indicating whether data from the source node and the target node to the UE are different or the same.

3. The method of claim 2, wherein the information indicates that the data from the source node and the target node to the UE are different, and wherein the UE combines the first set of PDUs and the second set of PDUs in accordance with the PDU sequence number and a data split pattern indicating a relation between the first set of PDUs and the second set of PDUs.

4. The method of claim 3, wherein the at least one of the activation command and the access request message further includes the data split pattern.

5. The method of claim 2, wherein the information indicates that the data from the source node and the target node to the UE are the same, and wherein the UE combines the first set of PDUs and the second set of PDUs through duplicated PDU decoding and re-sequencing in accordance with the PDU sequence number.

6. The method of claim 1, further comprising:
blindly decoding, by the UE, information on a physical downlink control channel (PDCCH) from the target node after transmitting the access request message.

7. The method of claim 1, further comprising:
transmitting, by the UE, a series of physical layer measurement reports to the source node, the series of physical layer measurement reports including measurement results of the target node.

8. The method of claim 1, wherein the activation command is carried by a medium access control (MAC) control element (CE) of a MAC layer PDU or physical layer downlink control information (DCI).

9. The method of claim 1, wherein the radio access network supports a multi-radio dual connectivity (MR-DC) mechanism, the source node is a master node of the MR-DC mechanism, and the target node is a secondary node of the MR-DC mechanism.

10. The method of claim 1, wherein the access request message contains a primary secondary cell (PSCell) activation command for activating the target node as a secondary node of an MR-DC mechanism.

11. The method of claim 1, wherein the activation command is received when a first radio link condition between the UE and the source node is worse than a first threshold or a second radio link condition between the UE and the target node is better than a second threshold.

12. An apparatus in a source node serving a user equipment (UE) in a radio access network, comprising:
one or more processors coupled with a non-transitory memory storage storing instructions, wherein the one or more processors execute the instructions to cause the apparatus to perform operations including:
transmitting a handover pre-configuration message to the UE, the handover pre-configuration message including handover information of a target node in the radio access network, the handover information in the handover pre-configuration message indicating to the UE how to configure the UE to get prepared to be served by the target node;
transmitting an activation command to the UE, the activation command instructing the UE to access the target node in accordance with the handover information, wherein the UE transmits an access request message to the target node, and wherein at least one of the activation command and the access request message includes a protocol data unit (PDU) sequence number indicating from which PDU a data transmission from the target node to the UE starts; and
transmitting a first set of PDUs to the UE, wherein the UE receives a second set of PDUs from the target node, a sequence number of a first PDU in the second set of PDUs is equal to the PDU sequence number, and the UE combines the first set of PDUs and the second set of PDUs.

13. The apparatus of claim 12, wherein the activation command further includes information indicating whether data from the source node and the target node to the UE are different or the same.

14. The apparatus of claim 12, the operations further comprising:
transmitting a configuration message to the target node before transmitting the handover pre-configuration message to the UE, wherein the configuration message includes a handover configuration for the target node.

15. An apparatus comprising:
one or more processors coupled with a non-transitory memory storage storing instructions, wherein the one or more processors execute the instructions to cause the apparatus to perform operations including:
receiving a handover pre-configuration message from a source node serving the apparatus in a radio access network, the handover pre-configuration message including handover information of a target node in the radio access network, the handover information in the handover pre-configuration message indicating to the apparatus how to configure the apparatus to get prepared to be served by the target node;
receiving an activation command from the source node after receiving the handover pre-configuration message;
transmitting an access request message to the target node in accordance with the handover information in response to receiving the activation command, wherein at least one of the activation command and the access request message includes a protocol data unit (PDU) sequence number indicating from which PDU a data transmission from the target node to the apparatus starts;
receiving a first set of PDUs from the source node, and a second set of PDUs from the target node, a sequence number of a first PDU in the second set of PDUs being equal to the PDU sequence number; and
combining the first set of PDUs and the second set of PDUs.

16. The apparatus of claim 15, wherein the at least one of the activation command and the access request message further includes information indicating whether data from the source node and the target node to the apparatus are different or the same.

17. A method, comprising:
transmitting, an apparatus in a source node serving a user equipment (UE), a handover pre-configuration message to the UE, the handover pre-configuration message including handover information of a target node in a radio access network, the handover information in the handover pre-configuration message indicating to the UE how to configure the UE to get prepared to be served by the target node;
transmitting, by the apparatus, an activation command to the UE, the activation command instructing the UE to access the target node in accordance with the handover information, wherein the UE transmits an access request message to the target node, and wherein at least one of the activation command and the access request message includes a protocol data unit (PDU) sequence number indicating from which PDU a data transmission from the target node to the UE starts; and
transmitting, by the apparatus, a first set of PDUs to the UE, wherein the UE receives a second set of PDUs from the target node, a sequence number of a first PDU in the second set of PDUs is equal to the PDU sequence number, and the UE combines the first set of PDUs and the second set of PDUs.

18. The method of claim 17, wherein the at least one of the activation command and the access request message further includes information indicating whether data from the source node and the target node to the apparatus are different or the same.

* * * * *